US007706418B2

United States Patent
McDonald et al.

(10) Patent No.: US 7,706,418 B2
(45) Date of Patent: Apr. 27, 2010

(54) STRUCTURED SUBMOUNT FOR TUNER ASSEMBLY WITH OPTIONAL PHASE ADJUST

(75) Inventors: Mark McDonald, Milpitas, CA (US); Andrew Daiber, Emerald Hills, CA (US)

(73) Assignee: Intel Corporation, Santa Clara, CA (US)

( * ) Notice: Subject to any disclaimer, the term of this patent is extended or adjusted under 35 U.S.C. 154(b) by 156 days.

(21) Appl. No.: 11/967,209

(22) Filed: Dec. 30, 2007

(65) Prior Publication Data

US 2009/0168816 A1  Jul. 2, 2009

(51) Int. Cl.
*H01S 3/10* (2006.01)
*H01S 3/13* (2006.01)

(52) U.S. Cl. ............... 372/20; 372/29.016; 372/29.022

(58) Field of Classification Search ............ 372/20, 372/29.016, 29.022, 29.023
See application file for complete search history.

(56) References Cited

U.S. PATENT DOCUMENTS 7,218,650 B2 * 5/2007 McDonald .......... 372/9
2008/0239453 A1 10/2008 Finot et al.

* cited by examiner

*Primary Examiner*—Armando Rodriguez
(74) *Attorney, Agent, or Firm*—Carrie Boone; Carrie A. Boone, P.C.

(57) ABSTRACT

A structured sub-mount assembly is disclosed to support a hybrid assembly of tunable filters. The sub-mount assembly is constructed to provide a high thermal resistance path and high mechanical resonance frequency. Optionally, the structured sub-mount assembly includes a temperature-controlled phase adjust component disposed approximately midway between the two tunable filters. The structured sub-mount assembly may be part of a tunable laser or other application.

18 Claims, 4 Drawing Sheets

STRUCTURED SUBMOUNT FOR TUNER ASSEMBLY WITH OPTIONAL PHASE ADJUST

TECHNICAL FIELD

This application relates to tunable filters and, more particularly, to a structure for mounting a tunable filter.

BACKGROUND

Tunable filters may be used for many different applications, such as tunable lasers, tunable add-drop multiplexers, tunable dispersion compensation, and tunable receivers. Where the filters are used in a tunable laser, for example, the filters select one of several wavelengths used by the laser. One implementation for a tunable laser monolithically integrates the tunable filter with thermal resistance and a mechanically stiff mounting, using a tensile-strained thin-film thermal resistor fashioned from silicon nitride. This implementation requires a relatively inefficient use of wafer area to accommodate the thermal resistance function. Further, the placing of the various fabrication steps in series results in yield and latency hits.

Another tunable laser uses a micro-hotplate as a sub-mount, but a sub-mount without structuring. A simple diced glass plate does not provide a sufficiently high thermal resistance for a given size so as to permit low power operation of the thin bulk etalon temperature tunable filters (~150 microns Si) for standard telecom form factors and tuning ranges.

Thus, there is a continuing need for a structured sub-mount for a tunable filter that overcomes the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a structured sub-mount assembly is disclosed to support a hybrid assembly of tunable filters. The sub-mount assembly is constructed to provide a high thermal resistance path and high mechanical resonance frequency. Optionally, the structured sub-mount assembly includes a temperature-controlled phase adjust component disposed approximately midway between the two tunable filters. The structured sub-mount assembly may be part of a tunable laser or other application.

Figure 1:
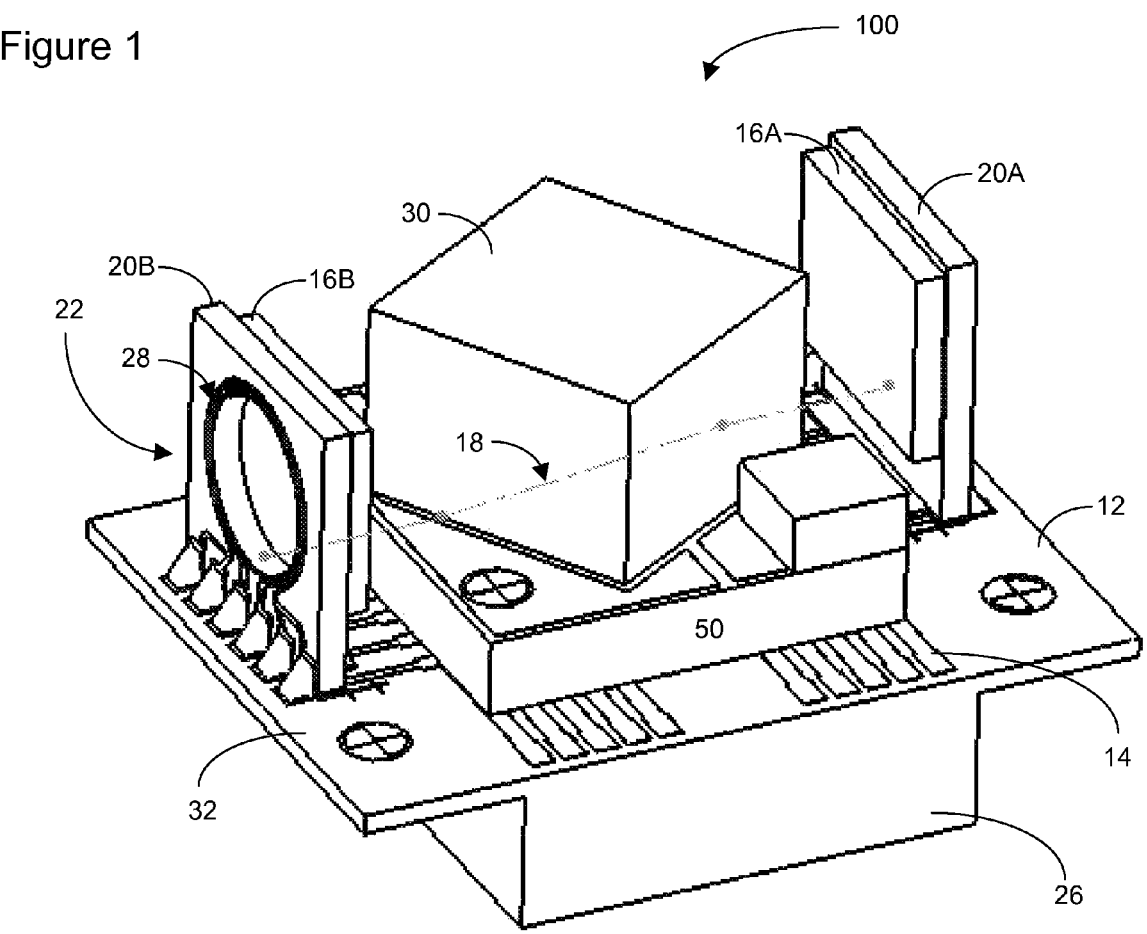
FIG. 1 is a perspective view schematic diagram of a structured sub-mount for a tuner assembly, according to some embodiments.
Figure 2:
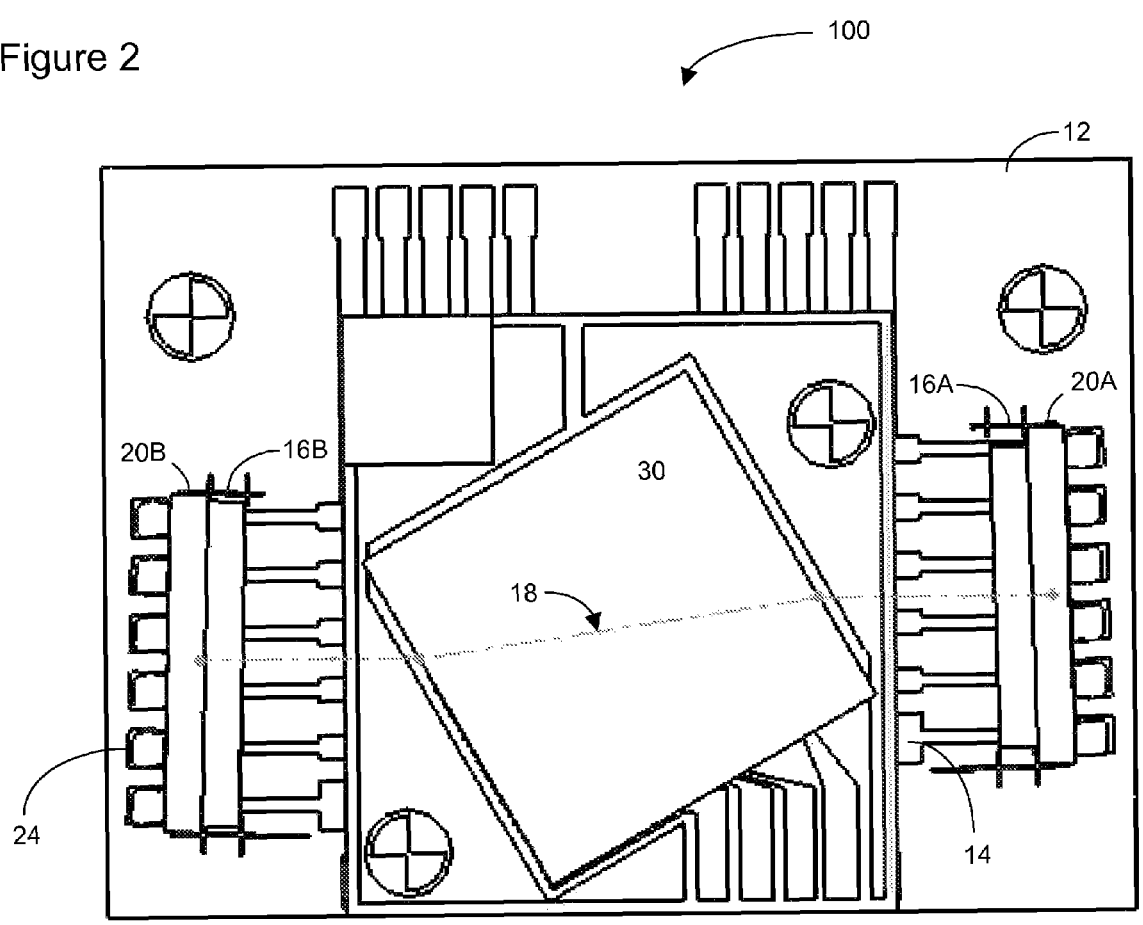
FIG. 2 is a birds-eye view schematic diagram of the structured sub-mount of FIG. 1, according to some embodiments.

FIGS. 1 and 2 are schematic drawings of a structured sub-mount assembly 100, according to some embodiments. The structured sub-mount assembly 100 includes two thermal control sub-mounts 20A and 20B (collectively, sub-mounts 20), each of which includes an aperture 22 and a surrounding metal trace 28, for sensing temperature and applying heat. Bonded to the sub-mounts 20 are filters 16A and 16B (collectively, filters 16). In some embodiments, the filters 16 are Fabry-Perot filters. The sub-mounts 20 and filters 16 are disposed upon a thermal isolation structure 12, which includes several electrical traces 14. The electrical traces 14 provide electrical connectivity between a package (not shown) and the heating and sensing traces 28. The sub-mounts 20 and filters 16 are heated by way of the electrical traces 14.

A light beam 18 transmitted through the structured sub-mount assembly 100 would first pass through the aperture 22 of the sub-mount 20B, then would be filtered through the filter 16B. If present, the light beam 18 then passes through a phase-adjust component 30, where it is then filtered through the filter 16A, subsequently passing through the aperture (not shown) of the sub-mount 20A.

Figure 4:
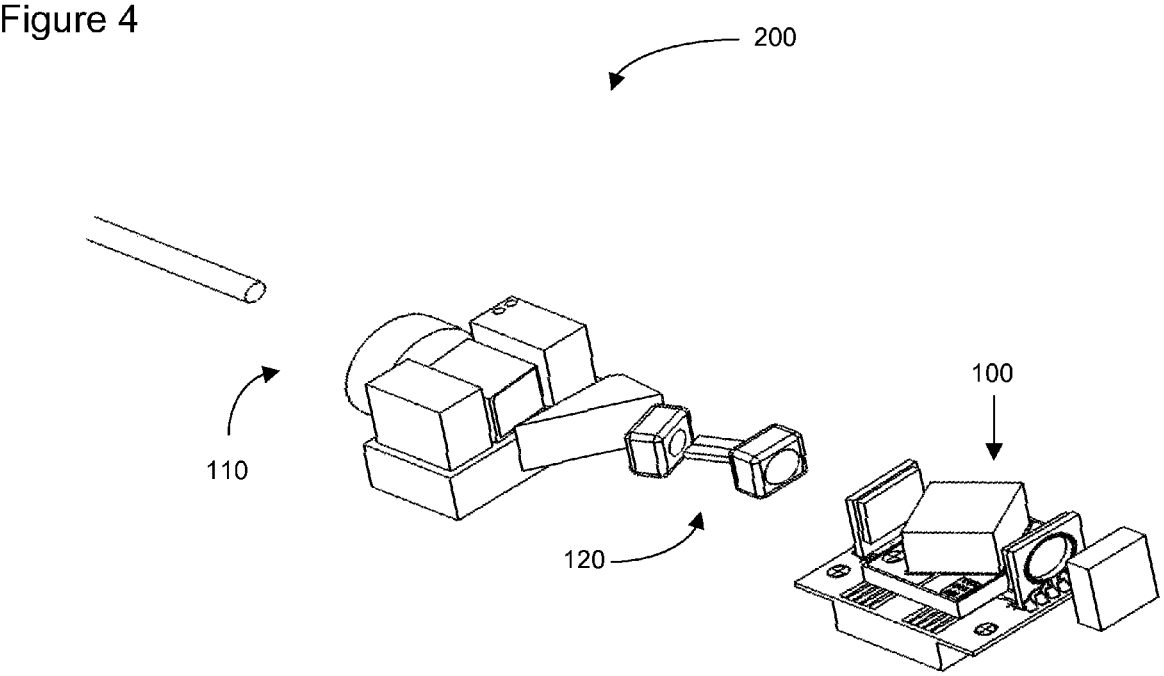
FIG. 4 is a block diagram of a tunable laser using the structured sub-mount of FIG. 1, according to some embodiments.

The structured sub-mount assembly 100 is part of a tunable laser, in some embodiments. FIG. 4 is a block diagram of a tunable laser 200, including the structured sub-mount assembly 100. The tunable laser 200 is described in more detail, below. In the tunable laser embodiment, the sub-mounts 20 are used to adjust the operable wavelength of the laser. A communication wavelength band may include 80 to 100 wavelengths, for example, each of which carries data traffic. A tunable laser programmable for any wavelength in the band is known as a full band tunable laser. Alternatively, the structured sub-mount assembly 100 may be used in other applications where tunable filters are used, such as in tunable add-drop multiplexers, tunable dispersion compensation, and tunable receivers. The structured sub-mount assembly 100 with an optional DC phase-adjust component 30 may be part of a product incorporating modulation, as one example.

In some embodiments, the sub-mounts 20 are constructed using a non-optical silicon micro-electro mechanical system (MEMs) process. In some embodiments, the filters 16 are also made from silicon, but employ an optical process, rather than the MEMs process.

The structured sub-mount assembly 100 further optionally includes a temperature-tunable, phase-adjust component 30. The phase-adjust component 30 is preferably disposed equidistant between the tunable sub-mounts 20. Such positioning of the phase-adjust component 30 minimizes differential temperature crosstalk, in some embodiments. The phase-adjust component 30 is made from silicon, in some embodiments, and optically expands when heated. When the structured sub-mount assembly 100 is part of a tunable laser, the phase-adjust component 30 is used to adjust the cavity length of the laser. In some embodiments, the cavity length is adjusted by up to two wavelengths (of light) by heating up the phase-adjust component 30. Between the optional phase-adjust component 30 and the structure 26 is a micro-hotplate 50. The micro-hotplate 50 is adjacent to the filters 16 and sub-mounts 20.

When used in a tunable laser, the optical phase-adjust component 30 of the structured sub-mount assembly 100 replaces a global thermoelectric cooler (TEC) that is used in some prior art implementations. Temperature control using a global TEC results in a thermal perturbation to all elements mounted to the TEC (e.g., isolators, tunable filters, and co-packaged or integrated modulators). Further, the global TEC is known to have high worst-case power consumption because it must cool all the elements mounted to the TEC.

In some embodiments, the structured sub-mount assembly 100 is designed to control thermal resistance. The surface of the thermal isolation structure 12 is made of glass, which is a poor thermal conductor. The sub-mounts 20 and filters 16 are made of silicon, which is an extremely good thermal conductor. In some embodiments, the temperature control sub-mounts 20, the filters 16, and, optionally, the phase-adjust component 30, are thermally tuned. When the elements of the structured sub-mount assembly 100 are heated or cooled, the silicon-based components (16, 20, and/or 30) optically expand or contract. (The physical dimensions of these components do not noticeably change, but their optical properties do change.) This optical expansion or contraction is caused by changes in the index of refraction of the components.

Thermal isolation structure 12 includes cantilevered portion 32. In some embodiments, the cantilevered structures 32 are thin structures formed from the underlying glass structure 12, part of which has been etched away, with the cantilever structures 32 remaining after the etch. Because these cantilevered structures 32 are made of very thin glass, they minimally conduct heat from the sub-mount filters 20, in some embodiments. Thus, the thin cantilever structures 32 provide thermal resistance at the target mechanical resonance frequency of the assembly 100.

In some embodiments, the structured sub-mount assembly 100 sits on a heat sink (not shown), such that the heat sink is disposed beneath the structure 26. The heat sink facilitates maintaining a constant temperature in the sub-mount assembly 100, once the sub-mounts 20 are tuned according to a desired wavelength. In some embodiments, the sub-mounts 20 are controlled over a 30-degree range. At 800 Kelvin/Watt (K/W), the structured sub-mount assembly 100 uses approximately 30 milliwatts of heat to operate the sub-mounts 20.

Figure 3:
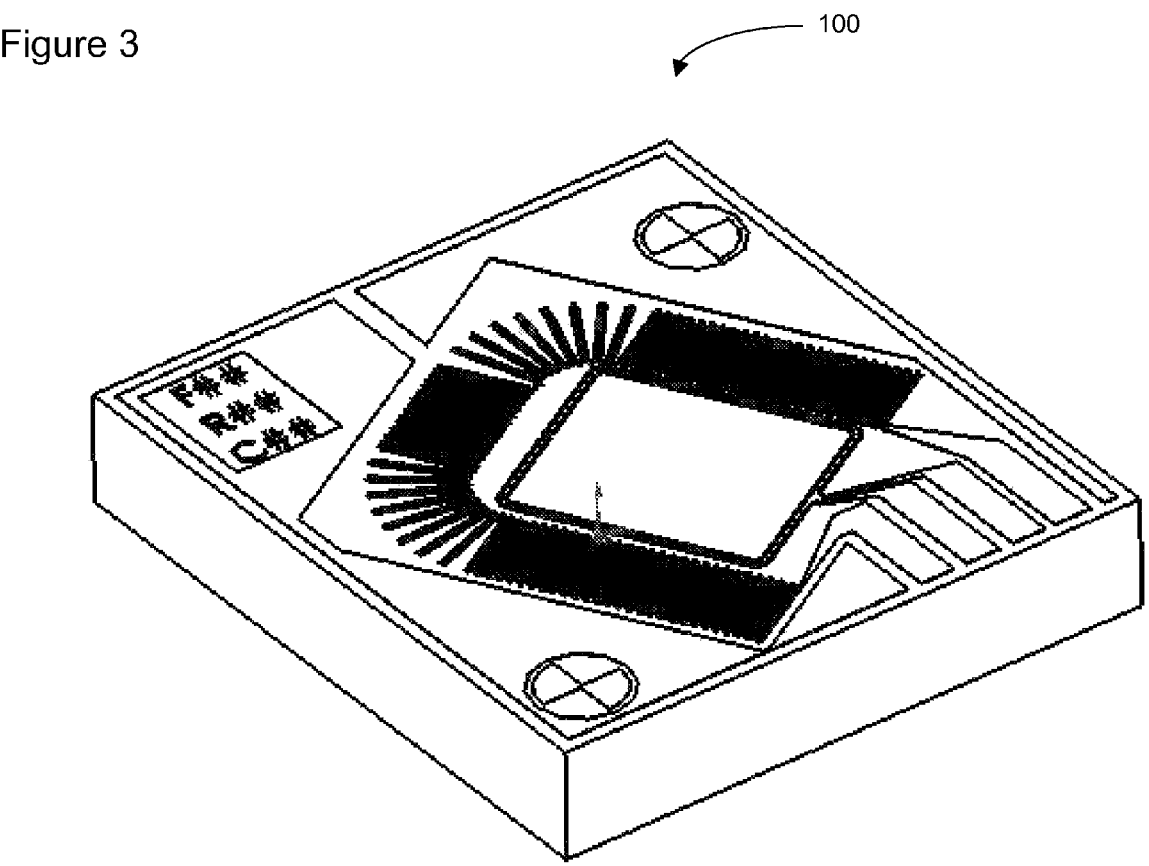
FIG. 3 is a perspective view schematic diagram of the micro-hotplate of the structured sub-mount of FIG. 1, according to some embodiments.

Between the optional phase-adjust component 30 and the structure 26 is a micro-hotplate 50, in some embodiments. FIG. 3 is a diagram of the independent, temperature-controlled micro-hotplate 50 for temperature control of the optional phase adjust component 30. The micro-hotplate 50 contains metal traces 52, 54, for sensing temperature and applying heat. The box-like traces 52 provide heat to the micro-hotplate 50 while the surrounding serpentine (forming a "U" shape) traces 54 are temperature sensors. In some embodiments, the temperature sensor traces 54 are fabricated from Platinum. The resistance of Platinum increases with temperature, allowing the temperature to be determined by measuring the resistance of the trace 54. Applying an electrical current to the heater traces 52 generates resistive heating that may be used to increase the temperature of the hotplate 50, as well as the optional phase-adjust component 30 (FIG. 1), as the phase-adjust component 30 is in thermal contact with the hotplate 50.

In some embodiments, the structured sub-mount assembly 100 is used as part of a tunable laser. FIG. 4 is a schematic diagram of a tunable laser 200, including the structured sub-mount assembly 100 of FIG. 1, according to some embodiments. The tunable laser 200 is known as an external cavity laser, because the laser cavity goes outside of the semiconductor gate material. As depicted in FIG. 4, external cavity including the structured sub-mount assembly 100, provides a wavelength reference, and performs tuning and locking. The gain medium 120 provides gain of the input signal. The output coupling 110 provides coupling optics to transfer the laser power to a single-mode fiber output.

The structured sub-mount assembly 100 employs a unique choice of materials, structure, and device thickness, in some embodiments. The material choice enables the coefficient of thermal expansion (CTE) of the tunable sub-mounts 20 to be matched, to ensure long-term stability. The thickness of the cantilevered portion 32 provides both thermal resistance and mechanical resonance. And, the structure of the assembly 100 enables optional placement of the phase-adjust component 30. Thus, the structured sub-mount assembly 100 meets a target of greater than 800 K/W thermal resistance, and a resonance frequency of greater than 30 kHz, in some embodiments.

The structured sub-mount assembly 100 is further novel in that, when used in a tunable laser, the assembly 100 is capable of adjusting the laser cavity length (phase), in some embodiments. By providing cavity length control that is independent from the TEC (heat sink) cold side temperature, the TEC temperature may be freely controlled for another purpose. For example, the TEC may be operated to minimize power consumption.

The optional phase-adjust component 30 of the structured sub-mount assembly 100 is designed to provide a high cavity length adjustment range (e.g., 2 wavelengths) at low temperature rise (~10K), using a thick silicon substrate. In some embodiments, the substrate of the component 30 is anti-reflection-coated to maximize transmission. Further, the component 30 is tilted to defeat any significant residual etalon properties, in some embodiments. The thickness and angle of incidence of the structured sub-mount assembly 100 are preferably chosen to ensure that roundtrip reflections result in spatial offsets of beam of greater than $\sim 1/e^2$ diameter of the beam traveling in the laser cavity.

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. An assembly, comprising:
   a sub-mount comprising heating and sensing elements;
   a filter disposed adjacent to the sub-mount;
   a thermal isolation structure upon which the sub-mount and filter are disposed; and
   electrical traces disposed upon the thermal isolation structure, wherein the electrical traces transmit power to the sub-mount and filter to optically expand the sub-mount and filter;
   wherein the sub-mount and filter optically expand when the heating and sensing elements are activated.

2. The assembly of claim 1, wherein the thermal isolation structure comprises glass.

3. The assembly of claim 1, further comprising:
   a phase-adjust component disposed adjacent to the sub-mount, wherein the phase-adjust component optically expands when the heating and sensing elements are activated.

4. The assembly of claim 3, wherein the phase-adjust component adjusts a cavity length of a tunable laser in which the assembly is disposed when the phase-adjust component is heated.

5. The assembly of claim 3, wherein the sub-mount, the filter, and the phase-adjust component are thermally tuned.

6. The assembly of claim 1, wherein the sub-mount is constructed using a non-optical silicon micro-electro mechanical system process.

7. The assembly of claim 1, wherein the filter is a Fabry-Perot filter constructed using a non-micro-electrical mechanical system optical process.

8. The assembly of claim 1, further comprising:
a micro-hotplate disposed upon the thermal isolation structure between the filter and a second filter, wherein the second filter is disposed adjacent to a second sub-mount, the second filter and second sub-mount also being disposed upon the thermal isolation structure;
wherein the micro-hotplate is made of glass.

9. The assembly of claim 8, wherein the micro-hotplate further comprises:
first traces to apply heat to the assembly; and
second traces to sense temperature of the assembly.

10. The assembly of claim 9, wherein the second traces comprise Platinum.

11. The assembly of claim 9, wherein a resistance of the second traces increases when a temperature applied to the second traces increases.

12. The assembly of claim 3, wherein a substrate of the phase-adjust component is anti-reflection coated to maximize transmission.

13. The assembly of claim 3, wherein the phase-adjust component is tilted to defeat residual etalon properties.

14. An assembly, comprising:
a sub-mount comprising heating and sensing elements;
a filter disposed adjacent to the sub-mount; and
a thermal isolation structure upon which the sub-mount and filter are disposed, wherein the sub-mount and filter optically expand when the heating and sensing elements are activated;
wherein the sub-mount is used to adjust the operable wavelength of a tunable laser inside which the assembly is disposed.

15. The assembly of claim 3, wherein the phase-adjust component is made from silicon and optically expands when heated.

16. The assembly of claim 4, wherein the phase-adjust component adjusts the cavity length of the tunable laser by up to two wavelengths.

17. A method to filter light, the method comprising:
transmitting a light beam through an aperture of a sub-mount;
filtering the transmitted light beam through a filter to generate filtered light, wherein the sub-mount and filter are disposed upon a thermal isolation structure; and
phase-adjusting the filtered light, wherein the phase-adjust component is optically expanded when heated;
wherein the sub-mount and filter are optically expanded when heated but the thermal isolation structure is not optically expanded.

18. The method to filter light of claim 17, further comprising:
adjusting a cavity length of a tunable laser in which the sub-mount, filter, and phase-adjust component are disposed when the phase-adjust component is heated.

* * * * *